United States Patent
Yakimenko

(10) Patent No.: US 11,332,253 B2
(45) Date of Patent: May 17, 2022

(54) HIGH-ALTITUDE PAYLOAD RETRIEVAL (HAPR) APPARATUS AND METHODS OF USE

(71) Applicant: THE UNITED STATES OF AMERICA, AS REPRESENTED BY THE SECRETARY OF THE NAVY, Arlington, VA (US)

(72) Inventor: Oleg Yakimenko, Seaside, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/727,656

(22) Filed: Dec. 26, 2019

(65) Prior Publication Data
US 2020/0172253 A1 Jun. 4, 2020

Related U.S. Application Data

(60) Division of application No. 15/251,766, filed on Aug. 30, 2016, now abandoned, which is a
(Continued)

(51) Int. Cl.
*B64D 17/72* (2006.01)
*B64D 17/02* (2006.01)
(Continued)

(52) U.S. Cl.
CPC ............ *B64D 17/72* (2013.01); *B64B 1/48* (2013.01); *B64D 17/02* (2013.01); *B64D 17/26* (2013.01)

(58) Field of Classification Search
CPC ........ B64D 17/02; B64D 17/26; B64D 17/72; B64B 1/48; B64C 2201/101
See application file for complete search history.

(56) References Cited

U.S. PATENT DOCUMENTS 1,019,271 A 3/1912 Nelson
1,189,112 A 6/1916 Howorth
(Continued)

OTHER PUBLICATIONS

Zhu et al., "Experimental Investigation of Inflatable Cylindrical Cantilevered Beams," JP Journal of Solids and Structures 2(2) (2008).
(Continued)

*Primary Examiner* — Philip J Bonzell
(74) *Attorney, Agent, or Firm* — Naval Postgraduate School; Scott Bell

(57) ABSTRACT

The disclosure provides an HAPR apparatus comprising an inflatable frame configured to generate canopy extension based on surrounding atmospheric pressure. The inflatable frame has a first collapse load limit less than the weight of the canopy at a first pressurized state less than 75 kPa and a second collapse load limit greater than the weight of the canopy at a second pressurized state of greater than 95 kPa. The internal pressure of the inflatable frame is typically about 101 kPa. The HAPR apparatus allows ascension with the canopy hanging under its own weight to reduce ascension time, then generates canopy extension prior to release in essentially a zero velocity, zero dynamic pressure condition.

5 Claims, 4 Drawing Sheets

Related U.S. Application Data continuation-in-part of application No. 14/459,662, filed on Aug. 14, 2014, now abandoned.

(51) Int. Cl.
  *B64B 1/48* (2006.01)
  *B64D 17/26* (2006.01)

(56) References Cited

U.S. PATENT DOCUMENTS

| | | | |
|---|---|---|---|
| 1,337,788 A | 4/1920 | Mott | |
| 1,478,677 A | 12/1923 | Rogers | |
| 1,626,563 A | 4/1927 | Simon | |
| 1,678,537 A | 7/1928 | Schonbrun | |
| 1,687,537 A | 7/1928 | Schonbrun | |
| 1,840,618 A | 1/1932 | Castner | |
| 1,861,784 A | 6/1932 | Brown et al. | |
| 2,111,886 A | 3/1938 | Capel | |
| 2,369,286 A | 2/1945 | De Lopez | |
| 2,784,927 A | 3/1957 | Turolla | |
| 2,941,750 A | 6/1960 | Smith et al. | |
| 3,127,137 A | 3/1964 | Downing | |
| 3,137,465 A | 6/1964 | Mulcahy, Jr. | |
| 3,284,032 A | 11/1966 | Eckstrom | |
| 3,412,963 A | 11/1968 | Struble, Jr. | |
| 4,105,173 A | 8/1978 | Bucker | |
| 4,379,534 A | 4/1983 | Miller et al. | |
| 4,664,342 A | 5/1987 | Jones | |
| 5,044,579 A | 3/1991 | Bernasconi et al. | |
| 5,161,755 A | 11/1992 | Tsay | |
| 5,244,169 A | 9/1993 | Brown et al. | |
| 5,248,117 A | 9/1993 | Hennings | |
| 5,362,017 A | 11/1994 | Puckett | |
| 5,388,786 A | 2/1995 | Hirose | |
| 5,421,128 A | 6/1995 | Sharpless et al. | |
| 5,573,207 A | 11/1996 | Germain | |
| 5,620,153 A | 4/1997 | Ginsberg | |
| 5,967,463 A | 10/1999 | Payne | |
| 6,182,398 B1 | 2/2001 | Head | |
| 6,215,587 B1 | 4/2001 | Alfano | |
| 6,220,547 B1 | 4/2001 | Smith | |
| 6,263,617 B1 | 7/2001 | Turcot et al. | |
| 6,705,572 B1 | 3/2004 | Christopher | |
| 6,758,442 B2 | 7/2004 | Bailey | |
| 7,032,864 B2 | 4/2006 | Logosz | |
| 8,437,891 B2 | 5/2013 | Yakimenko et al. | |
| 8,483,891 B2 | 7/2013 | Yakimenko et al. | |
| 8,489,256 B2 | 7/2013 | Yakimenko | |
| 9,016,634 B1 | 4/2015 | Ratner et al. | |
| 9,540,091 B1* | 1/2017 | MacCallum | B64B 1/70 |
| 9,694,910 B2* | 7/2017 | MacCallum | B64D 10/00 |
| 9,868,537 B2* | 1/2018 | Leidich | B64D 17/343 |
| 10,829,229 B2* | 11/2020 | MacCallum | B64D 17/22 |
| 10,988,227 B2* | 4/2021 | MacCallum | B64B 1/70 |
| 2005/0040290 A1 | 2/2005 | Suhami | |
| 2007/0272801 A1 | 11/2007 | Hilliard et al. | |
| 2007/0272891 A1 | 11/2007 | Hilliard et al. | |
| 2009/0026319 A1 | 1/2009 | Strong | |
| 2013/0200218 A1 | 8/2013 | Suh | |
| 2017/0349291 A1* | 12/2017 | MacCallum | B64D 17/62 |

OTHER PUBLICATIONS

Wielgosz et al., "Behaviour of Inflated Fabric Beams at Medium Pressure," Proceedings of the Twelve International Conference on Composite Material. I.C.C.M. 12, 1999, paper 334.

Baginski et al,"Estimating the Collapse Pressure of an Inflatable Aerodynamic Decelerator," AIAA Aerodynamic Decelerator Systems Technology Conference 2013 (and AIAA Balloon Systems Technology Conference and AIAA Lighter-Than-Air Systems Technology Conference (2013).

Davids et al., "Load-Deformation Response of Pressurized Tubular Fabric Arches," AIAA 2009-2632, 50th AIAA/ASME/ASCE/AHS/ASC Structures, Structural Dynamics, and Materials Conference (2009).

Verheul et al., "Material selection and joining methods for the purpose of a high-altitude inflatable kite," AIAA 2009-2338, 50th AIAA/ASME/ASCE/AHS/ASC Structures, Structural Dynamics, and Materials Conference (2009).

Hill et al, "Explicit Finite Element Analysis of Inflatable Braided Strapped Beams," AIAA 2015-2126, 23rd AIAA Aerodynamic Decelerator Systems Technology Conference, Aerodynamic Decelerator Systems Technology Conferences (2015).

Wielgosz et al., "Mechanics of Inflatable Fabric Beams," ICCES 5(2) (2008).

Davids et al., "Finite-element analysis of tubular fabric beams including pressure effects and local fabric wrinkling," Finite Elements in Analysis and Design 44 (2007).

National Weather Service, "Radiosondes," available at http://www.srh.noaa.gov/jetstream/upperair/radiosondes.html, last accessed Aug. 30, 2016.

Wielgosz, et al., "Strength of Inflatable Fabric Beams at High Pressure," AIAA paper 2002-1292, 43rd AIAA/ASME/ASCE/AHS/ASC Structures, Structural Dynamics, and Materials Con (2002).

Zeldman et al.," Wrinkling prediction of cylindrical and conical inflated cantilever beams under torsion and bending," Thin-Walled Structures 44 (2006).

Adler et al., "Static and Dynamic Analysis of Partially Wrinkled Membrane Structures," AIAA paper 2000-1810, Proceedings of the 41st AIAA/ASME/ASCE/AHS/ASC structures, structural dynamics, and materials conference (2000).

Knacke, Theo W., Parachute Recovery Systems Design Manual, NWC TP 6575 (1991).

* cited by examiner

HIGH-ALTITUDE PAYLOAD RETRIEVAL (HAPR) APPARATUS AND METHODS OF USE

RELATION TO OTHER APPLICATIONS

This patent application is a divisional application of and claims priority from U.S. patent application Ser. No. 15/251,766, filed Aug. 30, 2016, which further claims priority from U.S. nonprovisional patent application Ser. No. 14/459,662, filed Aug. 14, 2014, each of which is hereby incorporated by reference in its entirety.

FIELD OF THE INVENTION

One or more embodiments relates to the field of aeronautics and astronautics, and more specifically, to a canopy suitable for ascent from lower altitude and descent from high altitude.

BACKGROUND

Research performed at stratospheric altitudes allows for the collection of an enormous amount of meteorological, geophysical, and other scientific data. Typically instrument payloads are towed by high-altitude balloons filled with helium or hydrogen into the stratosphere, generally attaining between 60,000 to 120,000 feet (ft), before being released from the balloon occurs either due to active line severing or balloon burst. Following release, the payload descends back to ground level using a high-altitude parachute system. Survival and retrieval of the payload following the release is directly dependent on the effectiveness of the high-altitude parachute system through all stages of deployment.

There are several problems known in the art with respect to the use of high-altitude decelerators in the upper levels of the earth's atmosphere. Thin atmospheric conditions may result in insufficient dynamic pressure to deploy a decelerator within the necessary time frame. Dynamic pressure is dependent on surrounding air density and the descent velocity, and when a decelerator such as a parachute or parafoil is deployed in the stratosphere, its full expansion may be delayed or not occur at all due to both the lower density of air in the stratosphere and a low velocity upon initial release. Correspondingly, when dynamic pressure is low, the decelerator may collapse and portions of the canopy and suspension lines may tangle. In some cases, this results in complete failure of opening even after the decelerator enters atmospheric levels with higher air densities and develops sufficient dynamic pressure. Without the ability to achieve a fully deployed planform, the payload descent may become ballistic and uncontrollable.

There have been numerous attempts in the prior art to add structures to decelerator systems to provide rigidity to canopy structures. However, these decelerator structures known in the art do not intend to operate in near zero dynamic pressure environments, but rather to prevent a parafoil cross section collapse at low angle of attack, or to provide rapid parachute deployment at low altitudes. These structures are bulky and heavy, and generally require gas pressurized to well over one atmosphere of pressure. Additionally, these decelerator structures generally establish rigidity independent of prevailing altitude, so that stiffness of the structure remains relatively constant throughout deployment, which worsens stability of decelerator system and degrades its controllability. Using these decelerator structures as high-altitude decelerators deployed from a balloon, would mean maintaining a rigid structure and canopy deployment unnecessarily at low altitudes during an ascent phase, which would increase drag and extend ascension times, and allow rigidity to continue at the low altitudes during descent, which could interfere with canopy guidance toward a particular landing zone.

It would be advantageous to have a system to preposition canopies into an intended planform prior to release at higher altitudes of about 65,000 ft to offset minimum dynamic pressures, while also providing for a loss or absence of rigidity through ranges below about 33,000 ft. Such a system would allow for reduced drag and rapid transport through lower altitudes below about 33,000 ft as the high-altitude canopy retains a flexible disposition during ascension, and would provide high-altitude canopy pre-positioning once released at high altitudes of about 65,000 ft in essentially a free fall condition in order to mitigate any failures to fully deploy. Such a system would additionally allow a return to flexibility at lower altitudes during descent, in order to minimize any potential interference with canopy deflections that might be employed during guidance toward a specified landing zone.

These and other objects, aspects, and advantages of the present disclosure will become better understood with reference to the accompanying description and claims.

SUMMARY

The disclosure provides a High-Altitude Payload Retrieval (HAPR) apparatus for full planform deployment at high altitude. The HAPR apparatus comprises an inflatable frame configured on a canopy to generate either rigidity or flexibility of the canopy based on surrounding atmospheric pressures during ascent or descent. The inflatable frame is configured and coupled to the canopy to extend the canopy when the inflatable frame is inflated to a non-wrinkling condition, and further to have a first collapse load limit less than the weight of the canopy at a first pressurized state less than 75 kilopascals (kPa), and a second collapse load limit greater than the weight of the canopy at a second pressurized state of greater than 95 kPa, where the pressurized state indicates a difference in pressure between an internal pressure within the inflatable frame and a pressure surrounding the canopy. In a particular embodiment, inflatable members comprising the inflatable frame comprise an inner layer and outer layer, and a braided fiber reinforcement comprising the outer layer is constructed to provide the first and second collapse load limits in response to the prevailing pressure condition.

The internal pressure of the inflatable frame is typically intended to be on the order of about 101 kPa so that the first pressurized state of less than 75 kPa generally occurs at altitudes less than about 33,000 ft and the second pressurized state of greater than 95 kPa generally occurs at altitudes greater than about 65,000 ft. The collapse load limits of the inflatable frame at the two pressurized states are designed relative to the weight of the canopy so that at lower altitudes below about 33,000 ft, and with about 101 kPa internal pressure in the inflatable frame, the first pressurized state is generally insufficient to support the weight of the canopy and the HAPR apparatus may ascend with the canopy essentially hanging under its own weight, while at higher altitudes above about 65,000 feet, the second pressurized state generates a collapse load limit greater than the canopy weight, in order to allow the inflatable frame to expand and extend the canopy over some portion of its intended planform prior to release of the canopy in essentially a zero velocity, zero dynamic pressure condition. The HAPR apparatus may be towed to higher altitude using any appropriate means, however it is expected the HAPR apparatus will typically be used for towing under the influence of a high-altitude balloon.

Additionally, methods for delivery a payload to high altitude using the HAPR apparatus are disclosed.

The novel apparatus and principles of operation are further discussed in the following description.

Figure 2:
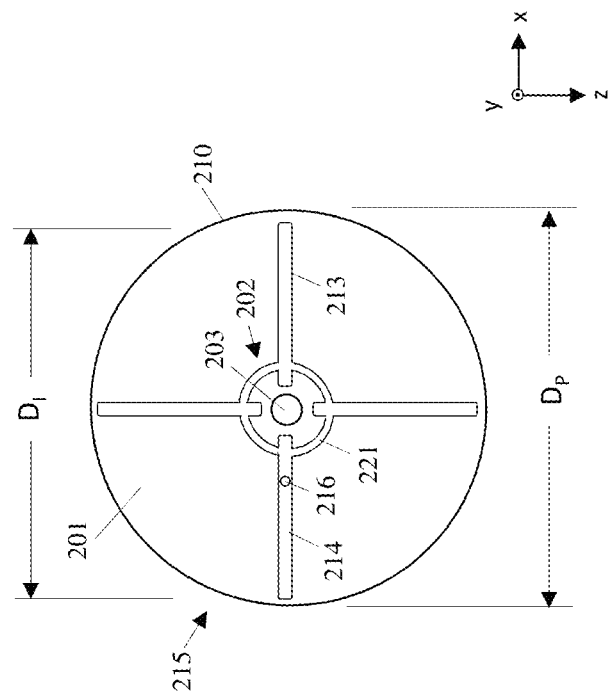
FIG. 2 illustrates an alternate view of the HAPR apparatus.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a high-altitude canopy comprising an inflatable frame having a first collapse load limit at a first pressurized state less than 75 kPa and a second collapse load limit at a second pressurized state of greater than 95 kPa.

The disclosure provides a High-Altitude Payload Retrieval (HAPR) apparatus for full planform deployment at high altitude. The HAPR apparatus comprises an inflatable frame coupled to a canopy and acting to extend the canopy based on surrounding and prevailing atmospheric pressure during ascent or descent. The inflatable frame may comprise a plurality of inflatable members, and is configured to extend the canopy when inflated to a non-wrinkling condition. Additionally, the inflatable frame has a first collapse load limit less than the weight of the canopy at a first pressurized state less than 75 kPa, and a second collapse load limit greater than the weight of the canopy at a second pressurized state of greater than 95 kPa, where the pressurized state indicates a difference in pressure between an internal pressure within the inflatable frame and a pressure surrounding the canopy. The internal pressure of the inflatable frame is typically intended to be on the order of about 101 kPa (substantially normal atmospheric pressure at ground level), so that the first pressurized state of less than 75 kPa generally occurs at altitudes less than about 33,000 ft and the second pressurized state of greater than 95 kPa generally occurs at altitudes greater than about 65,000 ft. These altitudes reflect typical altitudes of concern for deployment of payloads from ground level into the stratosphere. In a particular embodiment, inflatable members comprising the inflatable frame comprise an inner layer and outer layer, and a braided fiber reinforcement comprising the outer layer is constructed to provide the first and second collapse load limits in response to the prevailing pressure condition.

The collapse load limits of the inflatable frame at the two pressurized states are designed relative to the weight of the canopy in order that at lower altitudes below about 33,000 ft, and with about 101 kPa internal pressure in the inflatable frame, the first pressurized state of 75 kPa is generally insufficient to support the weight of the canopy and the HAPR apparatus may ascend to this altitude with the canopy essentially hanging under its own weight, as opposed to ascending under a fully supported planform posture which increases drag and increases ascent times. Similarly, at higher altitudes above about 65,000 feet (and lower surrounding pressures), the second pressurized state of 95 kPa generates a collapse load limit greater than the canopy weight, in order to allow the inflatable frame to expand and extend the canopy over some portion of its intended planform prior to release of the canopy in essentially a zero velocity, zero dynamic pressure condition. As the canopy and payload descend back below 33,000 ft and the first pressurized state re-establishes, the first collapse load limit reestablishes and the inflatable frame become flexible in order to mitigate any interference with canopy manipulations that might occur with, for example, guidance of the descending HAPR apparatus to a particular landing zone. In a particular embodiment, the HAPR apparatus additionally comprises a manually operated valve which establishes fluid communication with the interior volume of the inflatable frame and a surrounding atmosphere when open and which prevents such fluid communication when shut, in order to allow equalization and periodic replenishment of the interior volume of the inflatable frame with ground level pressures of about 101 kPa before a launching operation. The HAPR apparatus may be towed to higher altitude using any appropriate means, however it is expected the HAPR apparatus will typically be used for towing under the influence of a high-altitude balloon.

Figure 1:
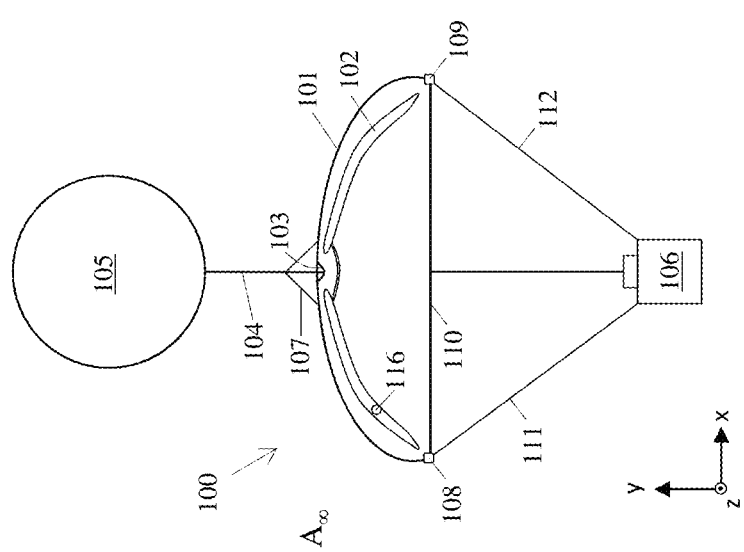
FIG. 1 illustrates an embodiment of the HAPR apparatus.

FIG. 1A illustrates an embodiment of HAPR apparatus 100 comprising canopy 101 and inflatable frame 102 coupled to canopy 101, with orientation in accordance with the axes shown. Canopy 101 is a flexible material. A line channel 103 passes through the canopy, and a plurality of fastening devices such as 108 and 109 are coupled to perimeter 110 of canopy 101. Additionally illustrated at FIG. 1 is a support line 104 passing through line channel 103 and coupled to a high-altitude balloon 105 and payload 106, and further attached to canopy 101 by support structure lines 107, as well as a plurality of suspension lines such as 111 and 112 extending from the plurality of fastening devices to payload 106. Canopy 101 is further illustrated as canopy 201 at FIG. 2 with orientation in accordance with the axes shown, with line channel 203, perimeter 210, and the inflatable frame generally indicated at 202. At FIG. 2, inflatable frame 202 comprises a plurality of inflatable members such as 213 and 214 with each inflatable member in fluid communication through, for example pneumatic airway connection 221. Additionally, canopy 201 has a predetermined planform generally indicated at 215, where predetermined planform 215 has a projected diameter extending over the dimension $D_P$.

The delivery of a payload from ground level to high altitude using a means such as a high-altitude balloon 105, followed by return of the payload to ground level through employment of a drag-inducing device such as canopy 101, is a known methodology for high-altitude deployment and return of various instrumentation and devices. As is understood, the release of canopies such as 101 at high altitudes on the order of 65,000-130,000 ft (10,058-19,812 m) and in essentially a free-fall condition often leads to failures of the canopy to fully inflate due to greatly mitigated dynamic pressures, as previously discussed. It would be advantageous to have a means to preposition canopies into an intended planform prior to release at these higher altitudes. However, ascent of a canopy positioned into its predetermined planform through the range of about 0-33,000 ft (0-10,058 m) introduces drag and decreases the ascent rate. Correspondingly, it would be advantageous if the canopy positioning means was substantially nullified below about 33,000 ft during ascent, in order to reduce drag and increase ascension rate through this range. Nullification of the means below 33,000 feet provides additional advantages during the descent phase, as once full inflation of the canopy is achieved at higher altitudes during descent, then any prepositioning means not only becomes redundant but may also act to hinder canopy flexibility and subsequent guidance toward an intended landing zone. Correspondingly, the inflatable frame disclosed here is intended to be flexible and non-rigid at lower altitudes and higher atmospheric pressures during canopy ascent from ground level, then develop rigidity and establish the canopy planform at the higher altitude and lower surrounding pressures of deployment, followed by a loss of rigidity and return to flexibility to minimize interference with the canopy once dynamic pressure is established to maintain the planform and the canopy descends back to altitudes of higher atmospheric pressure. The subsequent loss of canopy rigidity is a particularly important feature when guidance based on canopy deflection is employed for landing zone delivery.

In order to provide this functionality, inflatable frame 102 is coupled to the canopy and configured on the canopy to establish a projected span of the canopy when the inflatable frame is inflated to a non-wrinkling condition. Various wrinkling states are known in the art of inflatable structures, as will be discussed. In some embodiments, the projected span is at least 50% of a projected maximum dimension of an inflated planform, and in other embodiments the projected span is at least 30% of a maximum constructed dimension of a constructed shape of a canopy. In a particular embodiment, the maximum projected dimension is a maximum dimension of a predetermined planform such as the projected diameter $D_P$ of FIG. 2. Inflatable frame 102 is coupled to canopy 101 generally at a plurality of locations such that movement of inflatable frame 102 generates corresponding movement of canopy 101, and as a result canopy 101 establishes a posture relative to a projected diameter or other dimension based on the position and load strength of inflatable frame 102, both of which vary as a function of an atmospheric pressure surrounding the HAPR apparatus.

At FIG. 1, inflatable frame 102 surrounds an interior volume which typically surrounds a gas at some internal pressure, and which is not in fluid communication with an atmosphere $A_\infty$ surrounding the canopy. Further, inflatable frame 102 is configured to have a first collapse load limit which is less than the weight of the canopy at a first pressurized state of less than 75 kPa atmospheres, and configured to have a second collapse load limit greater than the weight of the canopy at a second pressurized state greater than 95 kPa. Here, "pressurized state" means a difference in pressure between an internal pressure within the interior volume of inflatable frame 102 and a surrounding pressure such as $A_\infty$ around the inflatable frame and canopy. As a result, in the second pressurized state, inflatable frame 102 develops sufficient strength to act against the canopy weight and establish all or a portion of the planform before achieving altitudes greater than about 65,000 ft (19,812 m), while maintaining flexibility below about 33,000 ft (10,058 m), either during ascent or descent. In some embodiments, inflatable frame 102 is additionally configured to achieve the non-wrinkling state at the second pressure condition. Canopy 101 further includes line channel 103 through canopy 101 for attachment of payload 106 directly to a lifting means such as balloon 105, so that during the ascension and establishment of the canopy planform by inflatable frame 102 as surrounding pressures decrease, inflatable frame 102 is only required to act against canopy weight rather than being additionally required to act against the weight of the attached payload.

Figure 3:
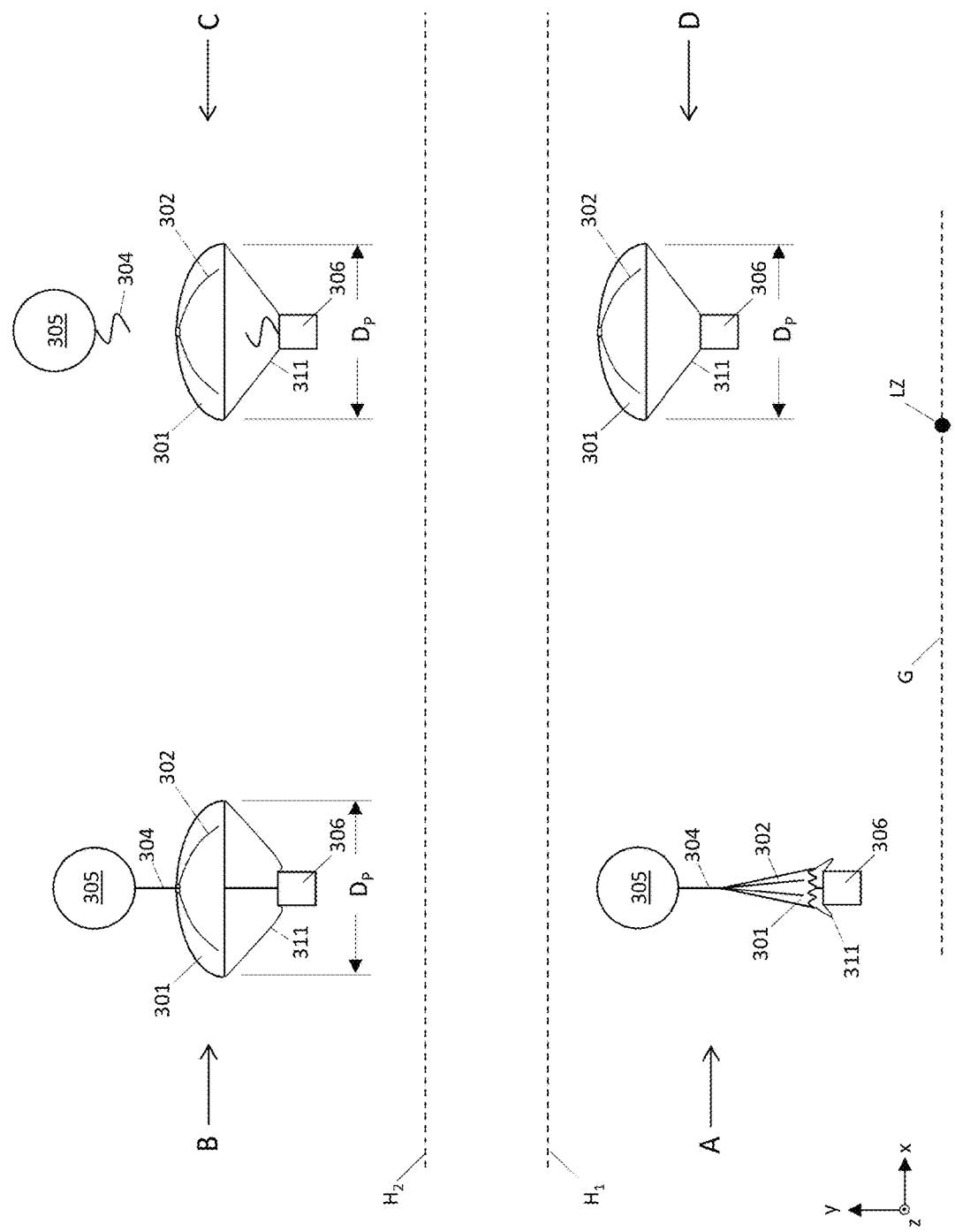
FIG. 3 illustrates deployment of the HAPR apparatus.

Operation of the HAPR apparatus disclosed is depicted at FIG. 3, illustrating canopy 301 and inflatable frame 302. A support line 304 passes through a line channel (not shown) of canopy 301 and extends between a high-altitude balloon 305 and a payload 306. Additionally, suspension lines such as 311 extend between payload 306 and canopy 301, connected to fastening devices (not shown) coupled to the perimeter of canopy 301. The fastening devices may be any devices suitable for coupling a line to a canopy including v-shaped tabs, stitching, reinforced holes, or any other suitable means. At FIG. 3, a ground level is indicated at G, an altitude of about 33,000 feet is indicated at $H_1$, and an altitude of about 65,000 feet is indicated at $H_2$. As is understood, at the altitude $H_1$, atmospheric pressure is anticipated to generally be about 26 kPa, and at altitude $H_2$, generally about 6 kPa. At FIG. 3, inflatable frame 302 is pressurized to an internal pressure within its interior volume of about 101 kPa, correlated generally to an atmospheric pressure at ground level G. At FIG. 3, inflatable frame 302 is a plurality of inflatable members such as members known generally as inflatable beams, with each inflatable member in the plurality in fluid communication with every other inflatable member in the plurality, so that the 101 kPa pressure acting within the interior volume of inflatable frame 302 acts through each of the inflatable members.

At the position generally indicated at A, the HAPR apparatus has been released from ground level G and is ascending under the influence of a high-altitude balloon 305. As discussed, inflatable frame 302 is pressurized to an internal pressure within its interior volume of about 101 kPa. At position A, below altitude $H_1$, atmospheric pressure is greater than the $H_1$ pressure of 26 kPa, and correspondingly inflatable frame 302 experiences a first pressurized state of less than 75 kPa. As a result, at the first pressurized state of less than 75 kPa, inflatable frame 302 has a collapse load limit which is less than the weight of canopy 301, and lacks sufficient rigidity to support the weight of canopy 301. Additionally at A, ascension of payload 306 is proceeding under the influence of a high-altitude balloon 305 via support line 304 passing through canopy 301. Correspondingly, suspension line 311 is not in tension.

At the position generally indicated at B, the HAPR apparatus has ascended through the altitudes between $H_1$ and $H_2$ and to a position above altitude $H_2$. As discussed, inflatable frame 302 is not in fluid communication with the atmosphere surrounding the canopy, and remains pressurized to an internal pressure of about 101 kPa. At position B, above altitude $H_2$, atmospheric pressure is less than the $H_2$ pressure of 6 kPa, and correspondingly inflatable frame 302 experiences a second pressurized state of greater than 95 kPa. As a result, at the second pressurized state of greater than 95 kPa, inflatable frame 302 has a collapse load limit which exceeds the weight of canopy 301. Additionally, as discussed, inflatable frame 302 is coupled to canopy 301 and configured on canopy 301 to establish at a projected span of the canopy when in a non-wrinkling condition, where the projected span is at least 50% of a projected maximum dimension of canopy 301 when inflated planform, or at least 30% of a maximum constructed dimension of a constructed shape of a canopy 301. At FIG. 3, the maximum projected dimension is the projected diameter $D_P$ of the predetermined planform and as shown, inflatable frame 302 is configured to establish substantially all of the projected diameter $D_P$. Here, and as will be discussed, establishing a particular percentage of a projected or constructed dimension means that under the influence of inflatable frame 302, canopy 301 assumes a posture where a projection of canopy 301 onto a horizontal plane parallel to the x-z axes produces an area on the horizontal plane having a dimension which is at least equal to the projected span of at least 50% of the projected maximum dimension of the predetermined planform of canopy 301, or in some embodiments, at least 30% of the maximum constructed dimension of the constructed shape of canopy 301. As a result, canopy 301 has been largely shaped into the intended predetermined planform for descent prior to release of payload 306 from high-altitude balloon 305 and subsequent descent of canopy 301 and payload 306.

At the position generally indicated at C, support line 304 has been severed and the HAPR apparatus commences descent from above the altitude $H_2$. Payload 306 is supported by canopy 301 through suspension lines such as 311. As is understood, the conditions at C may be generated either through a line severing mechanism or the bursting of high-altitude balloon 305.

At the position generally indicated at D, the HAPR apparatus has descended from above altitude $H_2$ to below altitude $H_1$. As before, below altitude $H_1$, atmospheric pressure is greater than the $H_1$ pressure of 26 kPa, and correspondingly inflatable frame 302 again experiences the first pressurized state of less than 75 kPa. As a result, inflatable frame 302 has a collapse load limit which is less than the weight of canopy 301 and lacks sufficient rigidity to support canopy 301, however the terminal velocity of the HAPR apparatus is sufficient to generate a dynamic pressure and maintain canopy 301 inflated. Having lost rigidity, inflatable frame 302 returns to a flexible state, greatly mitigating any interference with canopy 301 manipulation which might be attempted for steering toward a landing zone location such as LZ.

The HAPR apparatus disclosed is generally intended to provide the functionality described for an internal pressure within the interior volume of inflatable frame 102 of about 85-115 kPa, preferably about 95-105 kPa, and typically about 101 kPa. This allows initially establishing the internal pressure through equalization with atmosphere at ground level. In order to allow for equalization both initially and periodically between ascensions, in some embodiments the HAPR apparatus comprises a manually operated mechanism for the establishment of fluid communications between the interior volume of inflatable frame 102 and an atmosphere surrounding the HAPR apparatus, as indicated at 116 of FIG. 1 and 216 of FIG. 2. Manually operated mechanism 116 has an open position which allows fluid communication between the interior volume of inflatable frame 102 and the atmosphere surrounding the canopy to provide for equalization with pressure at substantially ground level before a launch. Manually operated mechanism 116 additionally has a shut position to prevent fluid communication between the interior volume and the atmosphere surrounding the canopy during ascent and descent, so that the first pressurized state and the second pressurized state may arise during operation and the HAPR apparatus may function as disclosed. Manually operated mechanism 116 addresses the difficulty in constructing structures which remain airtight over a long term and over repeated exposures to significant pressure differentials, and provides for periodic replenishment of the interior volume to the typical internal pressure of about 101 kPa. Manually operated mechanism 116 may be any type of device which allows for manual operation and provides the open/shut position as described, such as a screw cap and threads, an appropriately sized globe or gate valve, a zipper connection, a zip-lock type closure seam or other manually actuated closure seam, or any other mechanism having an open and shut position and sealing capabilities to prevent fluid communication between the interior volume of the inflatable frame and a surrounding atmosphere.

As discussed, the HAPR apparatus achieves the previously described ascent/descent operations using an inflatable frame coupled to a canopy, where the inflatable frame is configured on the canopy to provide a projected span of the canopy when inflated to a non-wrinkling condition, and where the inflatable frame is configured to have a first collapse load limit less than the weight of the canopy at a first pressurized state less than 75 kPa and configured to have a second collapse load limit greater than the weight of the canopy at a second pressurized state of greater than 95 kPa. In some embodiments, the projected span is at least 50% of a projected maximum dimension of an inflated planform, and in other embodiments the projected span is at least 30% of a maximum constructed dimension of a constructed shape of a canopy.

As used herein, "maximum projected dimension" means a maximum dimension of an area generated when the predetermined planform of a fully inflated canopy is projected onto a horizontal plane, such as the x-z plane of FIG. 2. FIG. 2 generally depicts a circular canopy having a projected maximum dimension $D_P$, however the HAPR apparatus as described here may be applied to other planform shapes, such as elliptical and rectangular. Similarly, the "maximum constructed dimension" means a maximum dimension of a constructed shape of a canopy, where "constructed shape" means the maximum area of an canopy in an uninflated condition when the uninflated canopy is laid flat onto a horizontal plane perpendicular to a gravity vector and viewed from a direction parallel to the gravity vector, and where the canopy has a configuration such that when a payload is attached to a plurality of suspension lines connected to the canopy and the canopy is descending in an inflated condition, the payload is displaced from the inflated canopy in the direction of the gravity vector. Constructed dimensions, such as for example the constructed diameter ($D_C$) of a circular canopy or guide surface parachute, are known in the art. See Knacke T. W, Parachute Recovery Systems Design Manual, NWC TP 6575 (1991), among others.

As discussed above, the inflatable frame is coupled to the canopy generally at a plurality of locations such that movement of the inflatable frame generates movement of the canopy. Additionally, the inflatable frame is positioned on and attached to the canopy in a geometry such that when the inflatable frame is inflated to a rigid, non-wrinkling condition, the inflatable frame and plurality of locations points affect movement of the canopy and establish at least some portion of the canopy into the projected span. For example at FIG. 2, predetermined planform 215 has a projected diameter $D_P$, as discussed. Inflatable members 213 and 214 comprising inflatable frame 202 are coupled to canopy 201 and illustrated in a pressurized state generating a rigid, non-wrinkling condition. In this condition, the coupling of inflatable members 213 and 214 to canopy 201 in combination with the non-wrinkling condition of inflatable members 213 and 214 results in at least some portion of canopy 201 establishing the dimension $D_I$, where $D_I$ is at least 50% of the projected maximum dimension $D_P$. In likewise manner and in certain embodiments, inflatable frame 102 is coupled to the canopy and configured to establish at least 30% of a maximum constructed dimension of the canopy when inflated to a rigid, non-wrinkling condition.

Correspondingly and as used herein, when the inflatable frame acts to establish a projected span of the canopy when inflated to a non-wrinkling condition, this means that inflatable frame acts on some portion of the canopy through its coupling to the canopy and generates a projected area of the canopy on a horizontal plane such as the x-z plane of FIG. 2, and the projected area has a dimension equal to at least the projected span, where the projected span is at least 50% of a projected maximum dimension of an inflated planform or at least 30% of a maximum constructed dimension of a constructed shape of a canopy. Similarly, when the inflatable frame is configured on the canopy to establish the projected span, this means the inflatable frame is coupled to the canopy at one or more locations and the one or more locations are positioned such that movement of the inflatable frame positions some portion of the canopy in a manner that generates the projected span as defined.

Additionally, as used here, a "non-wrinkling condition" applied to an inflatable frame means the inflatable frame has an absence of structural wrinkling, where structural wrinkling means an out-of-plane deformation caused by localized buckling of a membrane or skin separating the interior volume of the inflatable frame from an environment surrounding the canopy. Structural wrinkling and material wrinkling are known in the art. See e.g., Adler et al., "Static and Dynamic Analysis of Partially Wrinkled Membrane Structures," AIAA paper 2000-1810, Proceedings of the 41st AIAA/ASME/ASCE/AHS/ASC structures, structural dynamics, and materials conference (2000); see also Veldman, "Wrinkling prediction of cylindrical and conical inflated cantilever beams under torsion and bending," *Thin-Walled Structures* 44 (2006), among others. Within this disclosure, the inflatable frame is configured on the canopy to establish the projected span when in a non-wrinkling condition, however this is generally only intended to be a description of the appropriate condition of the inflatable frame for evaluation of its configuration on the canopy, rather than describing a condition that must be achieved at a given pressurized state.

Additionally as used herein, "collapse load limit" means a magnitude of force applied to the inflatable frame and under which the inflatable frame lacks sufficient strength to sustain a the projected span of the canopy, where the projected span is at least 50% of the maximum projected dimension or 30% of the maximum constructed dimension, and where the force may be a summation of individual forces applied to the inflatable frame over one or more locations. The magnitude of the collapse load limit is dependent on the pressurized state of the inflatable frame as discussed further below, such that the inflatable frame has a first collapse load limit at a first pressurized state and a second collapse load limit at a second pressurized state. Additionally when an inflatable frame is coupled to a canopy at a plurality of locations or areas on the inflatable frame, the collapse load limit may be a distributed force defined by a plurality of individual forces where each individual force acts at one of the distinct locations or areas on the inflatable frame, and where the inflatable frame lacks sufficient strength to sustain the projected span of the predetermined planform when subject to the distributed force. In a particular embodiment, an inflatable frame is coupled to a canopy at a plurality of distinct locations on the inflatable frame and the weight of the canopy coupled to the inflatable frame generates a distributed weight loading acting over the plurality of distinct locations. In this embodiment, the collapse load limit is additionally defined as a distributed force consisting of a plurality of separate forces where each separate force acts at one of the distinct locations on the inflatable frame, and where the inflatable frame lacks sufficient strength to sustain the projected span of the canopy under the collapse load limit. In this embodiment, the inflatable frame has a first collapse load limit less than the distributed weight loading generated by the canopy at the first pressurized state of less than 75 kPa and a second collapse load limit greater than the distributed weight loading generated by the canopy at a second pressurized state of greater than 95 kPa.

It is known in the art that mechanical properties of inflatable structures such as inflatable frame 102 are generally dependent on a magnitude of internal pressure within the structure versus an external pressure present around the structure, outside a typically inflated bladder. See e.g., Zhu et al., "Experimental investigation of inflatable cylindrical cantilevered beams," *JP Journal of Solids and Structures,* 2 (2) (2008); see also Davids et al., "Load-Deformation Response of Pressurized Tubular Fabric Arches," 50th AIAA/ASME/ASCE/AHS/ASC Structures, Structural Dynamics, and Materials Conference (2009); see also Wielgosz, et al., "Strength of Inflatable Fabric Beams at High Pressure," AIAA paper 2002-1292, $43^{rd}$ AIAA/ASME/ASCE/AHS/ASC Structures, Structural Dynamics, and Materials Con (2002), among others. As discussed, inflatable frame 102 is an inflatable structure which surrounds an interior volume isolated from an atmosphere surrounding the canopy, such that an alteration of that surrounding pressure acts to impact the resulting mechanical properties of the inflatable frame. In the disclosed HAPR apparatus, the inflatable frame is constructed to have the first collapse load limit less than the weight of canopy 101 when the difference in pressure between an internal pressure of inflatable frame 102 and a surrounding pressure is low, such as would be expected at lower altitudes, and additionally constructed to have the second collapse load limit greater than the weight of canopy 101 when the difference in pressure between an internal pressure of inflatable frame 102 and a surrounding pressure is corresponding higher, such as would be expected at higher altitudes. In one embodiment, inflatable frame 102 is configured to have a collapse pressure of 75 kPa, where the collapse pressure is a minimum differential pressure to establish the projected span of the canopy, and where the differential pressure is a pressure difference between the interior volume of the inflatable frame and a pressure surrounding the canopy. See e.g., Baginski et al., "Estimating the Collapse Pressure of a Tension-Cone Aerodynamic Decelerator," *Journal of Spacecraft and Rockets,* 51(4) (2014). Means for predicting the collapse load limit of inflatable structures and members under various pressure conditions are known in the art. See e.g. David, "Finite-element analysis of tubular fabric beams including pressure effects and local fabric wrinkling," *Finite Elements in Analysis and Design* 44 (2007); see also Wielgosz et al., "Mechanics of Inflatable Fabric Beams," ICCES 5(2) (2008); see also Hill et al, "Explicit Finite Element Analysis of Inflatable Braided Strapped Beams," 23rd AIAA Aerodynamic Decelerator Systems Technology Conference, Aerodynamic Decelerator Systems Technology Conferences, (AIAA 2015-2126) (2015), among others.

Planforms are additionally known in the art. Here, "predetermined planform" is the area of the canopy as viewed from above the canopy when the canopy is in an inflated condition. Predetermined planforms are dependent on parachute type, canopy porosity, suspension-line length, velocity, canopy design, and other variables, and are generally known a priori through calculation or wind-tunnel tests for an anticipated set of conditions. At FIG. 2, predetermined planform 215 is the area projected onto a horizontal plane parallel with the x-z axes shown when canopy 201 is in the inflated position.

Figure 5:
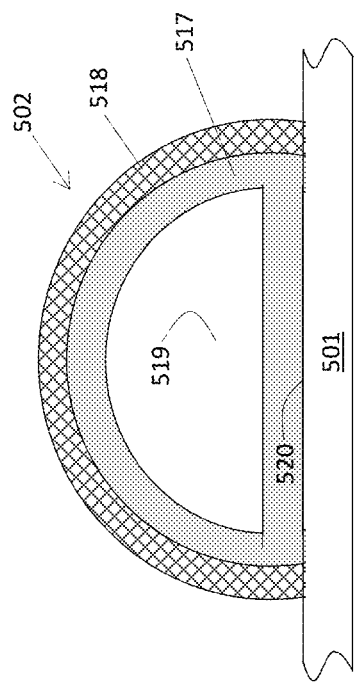
FIG. 5 illustrates another embodiment of an inflatable member.
Figure 4:
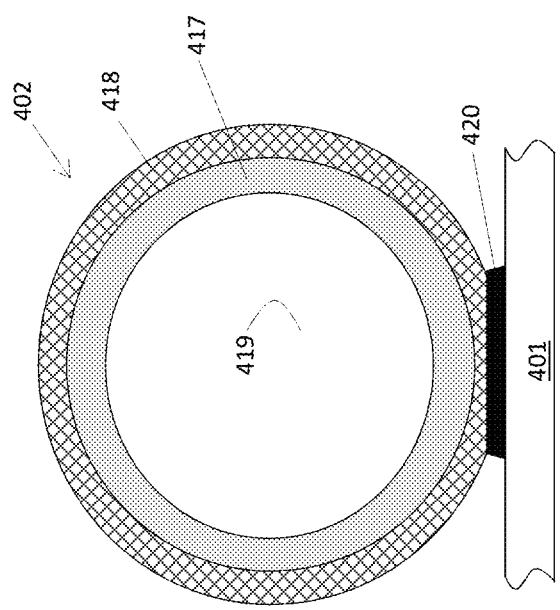
FIG. 4 illustrates an embodiment of an inflatable member.

As discussed, the inflatable frame surrounds an interior volume isolated from an environment surrounding the HAPR apparatus. The interior volume is a contiguous volume so that the pressurized states acting on the inflatable frame act uniformly through the inflatable frame. In an embodiment, the inflatable frame comprises a plurality of inflatable members in fluid communication with each other through a pneumatic airway, and the interior volume of each inflatable member and the pneumatic airway provides the interior volume of the inflatable frame. At FIG. 4, an exemplary embodiment of an inflatable member is illustrated in cross-section and comprises an inner layer 417 typically comprising a synthetic polymer and surrounding an interior volume 419, with an outer layer 418 of typically braided fiber reinforcement at least partially surrounding inner layer 417. The inflatable member is coupled to canopy 402 at 420. Methods for fabricating such inflatable members are known in the art and may include the use of coated or uncoated fabrics which are cut, laid-up, and fabricated to a desired shape by stitching, adhesive bonding, thermal welding, or other methods. Likewise, tubular weaving is known, as are methods of threading for production of curved inflatable members. As is understood, textile materials can be tailored to direct pre-stresses to various locations on an inflatable member in order to influence the strength and stiffness of the beam under an inflation condition. For example, the process generally known as braiding allows fibers to be placed along the axis of the inflatable member and at a particular angle with respect to the axis in order to influence the mechanical properties of the inflatable member. Such methods may be employed in order to generate an inflatable frame having a first collapse load limit less than a weight of the canopy at a first pressurized state of less than 75 kPa and having a second collapse load limit less greater than the weight of the canopy at a second pressurized state of greater than 95 kPa. See e.g., U.S. Pat. No. 5,044,579 issued to Bernasconi et al., issued Sep. 3, 1991; see also U.S. Pat. No. 5,421,128 issued to Sharpless et al., issued Jun. 6, 1995; see also U.S. Pat. No. 6,182,398 issued to Head, issued Feb. 6, 2001; see also U.S. Pat. No. 6,263,617 issued to Turcot et al., issued Jul. 24, 2001, among others. Another embodiment is illustrated at FIG. 5 showing inner layer 517 surrounding interior volume 519 with an outer layer 518 partially surrounding inner layer 517, where the inflatable beam is substantially embedded in canopy 502 along connection area 520. It is also possible to achieve a certain slight curvature of an inflatable member in the inflated condition if, for example, a relatively straight inflatable member is attached along canopy 502 with canopy 502 possessing a curvature, such that the inflatable beam subsequent to inflation will extend along canopy 502 with substantially the same curvature.

In a particular embodiment such as that of FIG. 2, the line channel 203 encompasses the centroid of canopy 201. In another embodiment, inflatable frame 202 comprises a plurality of inflatable members such as 213 and 214, and some portion or all of the inflatable members in the plurality extend in a radial direction from the centroid to perimeter 210 of the predetermined planform. Here, "centroid" means the arithmetic mean or average position of all the points on the constructed shape of the canopy. In another embodiment, canopy 201 has an outer skin and an inner skin, where the inner skin is between the outer skin and a payload when a payload is attached to canopy 201 and canopy 201 is in an inflated condition, and inflatable frame 202 is coupled to canopy 201 at the outer skin.

Figures 6, 7:
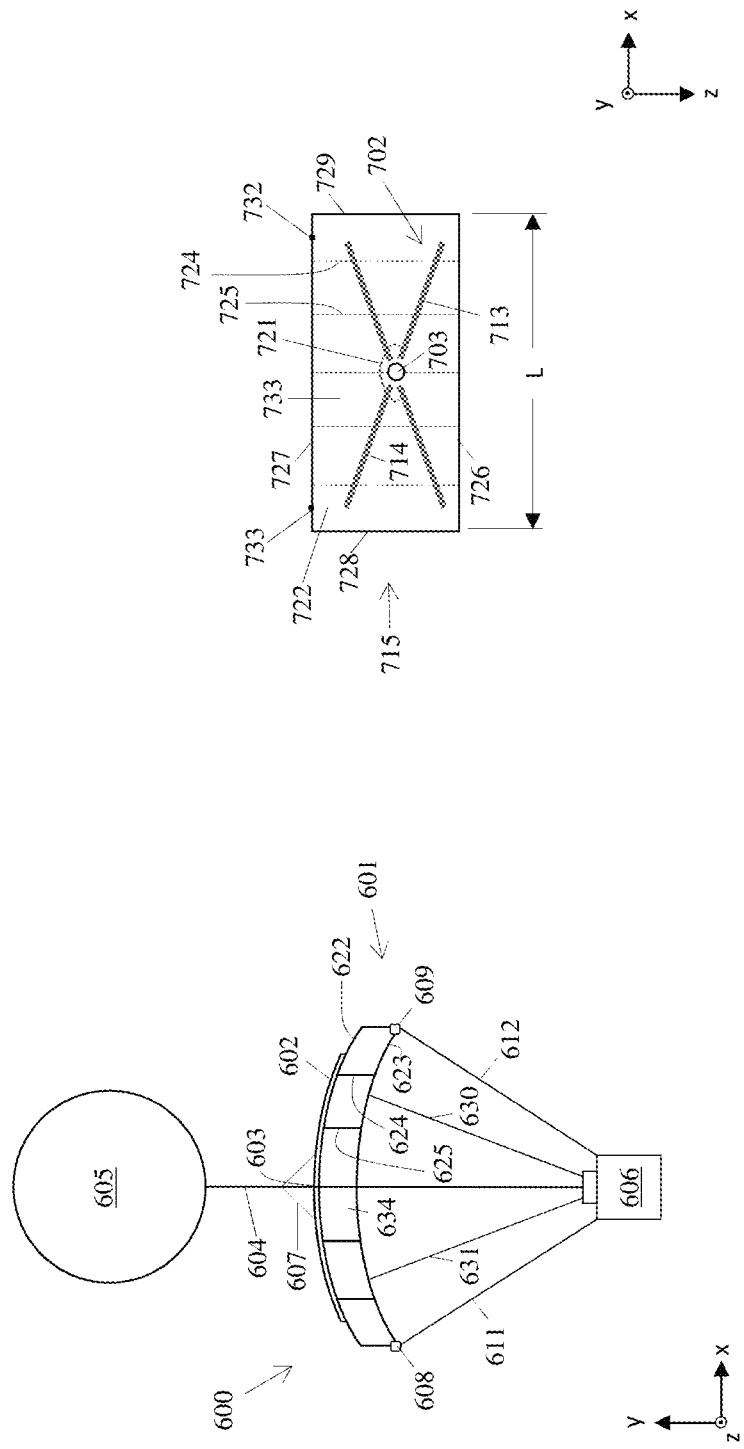
FIG. 6 illustrates a second embodiment of the HAPR apparatus.
FIG. 7 illustrates an alternate view of the HAPR apparatus.

FIG. 6 illustrates another embodiment of a high-altitude canopy 600 comprising canopy 601, inflatable frame 602, and line channel 603, and fastening devices 608 and 609. Canopy 602 is a type known generally as a parafoil and further comprises an upper skin 622, a lower skin 623, and a plurality of rib panels such as 624 and 625 extending between upper skin 622 and lower skin 623 to form a plurality of elongated cells such as 634. Inflatable frame 602 is coupled to upper skin 622 of canopy 601, and line channel 603 passes through canopy 601 with support line 604 passing through line channel 603, coupled to high-altitude balloon 605, and attached to payload 606, as well as attaching to canopy 601 by support structure lines 607. Fastening devices 608 and 609 are coupled to canopy 601 with suspension lines 611 and 612 extending between payload 606 and canopy 601. A plurality of control lines 630 and 631 extend from payload 606 to canopy 601 for canopy 601 guidance during descent.

Canopy 601 is further illustrated as inflated canopy 701 at FIG. 7 with orientation in accordance with the axes shown, and illustrated with line channel 703 and an inflatable frame generally indicated at 702. At FIG. 7, inflatable frame 702 comprises a plurality of inflatable members such as 713 and 714 with each inflatable member in fluid communication through pneumatic airway connection 721. Additionally, the perimeter of the upper skin of canopy 701 comprises a leading edge 726, a trailing edge 727, a first lateral edge 728, and a second lateral edge 729 generally opposing the first lateral edge. At FIG. 7, control lines attach to canopy 701 at 732 and 733. Canopy 701 has the predetermined planform generally illustrated at 715 and extending over a projected dimension L. In like manner to high-altitude canopy 100, high-altitude canopy 600 accomplishes ascent/descent operations using inflatable frame 602 coupled to canopy 601, where inflatable frame 602 is configured on the canopy to establish a projected span of the canopy when inflated to a non-wrinkling condition, and where inflatable frame 602 is configured to have a first collapse load limit less than the weight of canopy 601 at a first pressurized state less than 75 kPa and a second collapse load limit greater than the weight of canopy 601 at a second pressurized state of greater than 95 kPa.

Additionally disclosed here is a method of launching and retrieving a high-altitude canopy and payload comprising obtaining a High-Altitude Payload Retrieval (HAPR) apparatus comprising the canopy, the inflatable frame, and the line channel, and further comprising a plurality of suspension lines coupled to a perimeter of the canopy. The method delineates coupling a payload to a support line at a first end, directing the support line through the line channel, and coupling an external device to the support line at a second end. In an embodiment, the external device is a high-altitude balloon, but may be any device capable of towing the HAPR apparatus to higher altitude. The method further requires pressurizing the interior volume of the inflatable canopy to a pressure greater than 95 kPa and less than 105 kPa to establish an internal pressure of the inflatable frame, and establishing the HAPR apparatus, the payload, the support line, and the external device at an altitude having a first atmospheric pressure where the internal pressure minus the first atmospheric pressure is less than 75 kPa. At the first atmospheric pressure, the first pressurized state exists for the inflatable frame and the first collapse load limit less than the weight of the canopy is established, and the inflatable frame and the canopy assume a first position at the first pressurized condition.

The method further describes towing the HAPR apparatus, the payload, and the support line to a higher altitude using the external device, where the higher altitude has a second atmospheric pressure less than the first atmospheric pressure, and where the internal pressure of the inflatable frame minus the second atmospheric pressure is greater than 95 kPa. This establishes the second pressurized state of greater than 95 kPa for the inflatable frame and additionally establishes the second collapse load limit of the inflatable frame greater than the weight of the canopy. The second collapse load limit allows positioning the canopy and the inflatable frame to a second position, where the second position establishes the projected span of the canopy and establishes a positioned canopy. The method further specifies disconnecting the support line from the external device, high-altitude balloon, when the positioned canopy is established, and returning the HAPR apparatus and the payload to a reduced altitude having a third atmospheric pressure, which re-establishes the first pressurized state for the inflatable frame and re-establishes the first collapse load limit of the inflatable frame which is less than the weight of the canopy, and maintaining the projected span of the canopy using dynamic pressure generated by the descent.

In some embodiments of the method the HAPR apparatus further comprises the manually operated mechanism having the open position and the shut position, and the HAPR apparatus, the payload, the support line, and the external device is initially placed at an altitude having pressure greater than 95 kPa and less than 105 kPa, such as ground level, and the interior volume of the inflatable frame is pressurized by opening and shutting the manually operated mechanism. 19. Additionally, in some embodiments of the method, the canopy has a predetermined planform and where the projected span of the canopy is equal to at least 50% of a maximum projected dimension of the predetermined planform of the canopy. In other embodiments, the projected span of the canopy is equal to at least 30% of a maximum constructed dimension of the canopy.

Thus, provided here is an HAPR apparatus for full planform deployment at high altitude comprising a canopy and an inflatable frame coupled to the canopy 101, where the inflatable frame is configured on the canopy to establish a projected span of the canopy when inflated to a non-wrinkling condition, and where the inflatable frame has a first collapse load limit less than the weight of the canopy at a first pressurized state less than 75 kPa and the inflatable frame has a second collapse load limit greater than the weight of the canopy at a second pressurized state of greater than 95 kPa. The inflatable frame provides a means to preposition the canopy into an intended planform prior to release at higher altitudes above about 65,000 feet, and while also effectively nullifying support capabilities below about 33,000 ft, in order to reduce drag and increase ascension rate through this range. The flexibility of the inflatable frame at lower altitudes additionally provides advantage during descent when guidance based on canopy deflection is employed for landing zone delivery.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A High-Altitude Payload Retrieval (HAPR) apparatus for full planform deployment at high altitude comprising:
   a canopy comprising a flexible material having a weight;
   a line channel passing through the canopy;
   an inflatable frame coupled to the canopy, where the inflatable frame is configured on the canopy to establish a projected span of the canopy when inflated at a ground level to a non-wrinkling condition, and where during ascent from the ground level, the inflatable frame is flexible and non-rigid at a first pressurized state when at elevations less than or equal to approximately 33,000 feet and the inflatable frame is rigid at a second pressurized state when at elevations greater than approximately 33,000 feet;
   a plurality of fastening devices coupled to a perimeter of the canopy and configured to fasten a plurality of lines to the canopy; and
   wherein the canopy comprises:
   an upper skin having a leading edge, trailing edge, a first lateral edge, and a second lateral edge generally opposing the first lateral edge, where the inflatable frame is coupled to the upper skin;
   a lower skin;
   a plurality of rib panels each having an upper edge and a lower edge, with at least a portion of the upper edge affixed to the upper skin and at least a portion of the lower edge affixed to the lower skin, and the plurality of rib panels establishing a plurality of elongated cells, where each cell is defined by a portion of the upper skin, a portion of the lower skin, and a first rib panel and a second rib panel, where the first rib panel and the second rib panel are rib panels in the plurality of rib panels.

2. The HAPR apparatus of claim 1 the projected span of the canopy is equal to at least 30% of a maximum constructed dimension of the constructed shape of the canopy.

3. The HAPR apparatus of claim 1 where the inflatable frame comprises a plurality of inflatable members and where each inflatable member in the plurality of inflatable members surrounds an interior volume, and where each interior volume in the plurality of inflatable members is in fluid communication with every other interior volume in the plurality of inflatable members, and where each inflatable member is coupled to the canopy at one or more connection points on the canopy, and where the each inflatable member comprises an inner layer and an outer layer at least partially surrounding the inner layer, where the outer layer comprises a braided fiber reinforcement constructed to provide a first collapse load limit of the inflatable frame less than the weight of the canopy at the first pressurized state and constructed to provide a second collapse load limit of the inflatable frame greater than the weight of the canopy at the second pressurized state.

4. The HAPR apparatus of claim 3 further comprising a manually operated mechanism having an open position and a shut position and configured to allow fluid communication between at least one interior volume in the plurality of inflatable members and an atmosphere surrounding the canopy when in the open position and configured to prevent fluid communication between the at least one interior volume in the plurality of inflatable members and the atmosphere surrounding the canopy when in the shut position.

5. The HAPR apparatus of claim 4 where the line channel surrounds the centroid of a constructed shape of the canopy and where the each inflatable member in the plurality of inflatable members extends in a direction from the line channel toward a perimeter of the constructed shape of the canopy.

* * * * *